(12) United States Patent
Burd

(10) Patent No.: US 9,586,685 B2
(45) Date of Patent: *Mar. 7, 2017

(54) AIRCRAFT GALLEY WATER DISTRIBUTION MANIFOLD

(71) Applicant: B/E Aerospace, Inc., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,101

(22) Filed: Feb. 11, 2016

(65) Prior Publication Data

US 2016/0159482 A1 Jun. 9, 2016

Related U.S. Application Data

(63) Continuation of application No. 14/044,487, filed on Oct. 2, 2013, now Pat. No. 9,273,449.

(Continued)

(51) Int. Cl.
*B64D 11/04* (2006.01)
*E03B 1/00* (2006.01)
(Continued)

(52) U.S. Cl.
CPC .......... *B64D 11/04* (2013.01); *B64D 11/0007* (2013.01); *B64D 11/02* (2013.01);
(Continued)

(58) Field of Classification Search
CPC ..... B64D 11/02; B64D 11/04; B64D 11/0007; F16K 1/12; F16K 1/32; F16K 11/02;
(Continued)

(56) References Cited

U.S. PATENT DOCUMENTS 3,155,988 A * 11/1964 Cella ...................... B64D 11/02
4/323
3,356,249 A * 12/1967 Koester ................... F16K 24/04
220/293

(Continued)

FOREIGN PATENT DOCUMENTS

GB 809094 A 2/1959
WO 2011159168 A1 12/2011

OTHER PUBLICATIONS

Search Report, Oct. 23, 2015, 1 pages, from Chinese Application No. 2013800514367.

*Primary Examiner* — William McCalister
*Assistant Examiner* — Ian Paquette
(74) *Attorney, Agent, or Firm* — Shumaker, Loop & Kendrick, LLP

(57) ABSTRACT

A modular potable water distribution manifold for an aircraft water supply and drainage system includes a tubular element with a first manifold quick connector adapted to mate with a flexible hose connector and having a flow control poppet, a second manifold quick connector having a flow control poppet, the second manifold quick connector adapteded mate with a terminating self-venting/self-draining device, and a rotating ferrule that mates the second manifold with the self-venting/self-draining device.

4 Claims, 4 Drawing Sheets

Related U.S. Application Data

(60) Provisional application No. 61/709,834, filed on Oct. 4, 2012.

(51) Int. Cl.

| | | |
|---|---|---|
| *E03B 1/04* | (2006.01) | |
| *F16K 1/12* | (2006.01) | |
| *F16K 24/04* | (2006.01) | |
| *B64D 11/00* | (2006.01) | |
| *F16L 29/04* | (2006.01) | |
| *F16L 37/36* | (2006.01) | |
| *F16L 37/367* | (2006.01) | |
| *B64D 11/02* | (2006.01) | |

(52) U.S. Cl.
CPC ............... *E03B 1/00* (2013.01); *E03B 1/042* (2013.01); *F16K 1/12* (2013.01); *F16K 24/04* (2013.01); *F16K 24/042* (2013.01); *F16L 29/04* (2013.01); *F16L 37/36* (2013.01); *F16L 37/367* (2013.01); *Y02T 50/46* (2013.01); *Y10T 137/598* (2015.04)

(58) Field of Classification Search
CPC ........ F16K 11/04; F16K 11/044; F16K 24/00; F16K 24/04; F16K 24/042; F16K 24/044; F16K 24/06; E03B 1/00; E03B 1/042; F16L 29/00; F16L 29/02; F16L 29/04; F16L 33/00; F16L 33/18; F16L 37/28; F16L 37/30; F16L 37/32; F16L 37/36; F16L 37/367; F16L 37/38; F16L 37/40; F16L 37/46
USPC ............ 137/614.02, 614.03, 614.04, 614.05, 137/614.06, 844; 99/275
See application file for complete search history.

(56) References Cited

U.S. PATENT DOCUMENTS

| | | | |
|---|---|---|---|
| 4,027,701 | A | 6/1977 | Duckworth, Jr. |
| 4,646,773 | A | 3/1987 | Klop et al. |
| 4,712,575 | A | 12/1987 | Lair et al. |
| 4,742,843 | A | 5/1988 | McClaran |
| 5,203,372 | A * | 4/1993 | Freiler ............... F16K 17/0433 137/469 |
| 5,358,212 | A | 10/1994 | Soltys et al. |
| 5,429,149 | A | 7/1995 | Mittell et al. |
| 9,096,321 | B2 | 8/2015 | Burd |
| 9,273,449 | B2 * | 3/2016 | Burd ................ F16K 24/042 |
| 2006/0196542 | A1 | 9/2006 | Yen |
| 2013/0312844 | A1 | 11/2013 | Burd |
| 2014/0076445 | A1 | 3/2014 | Zhou et al. |

* cited by examiner

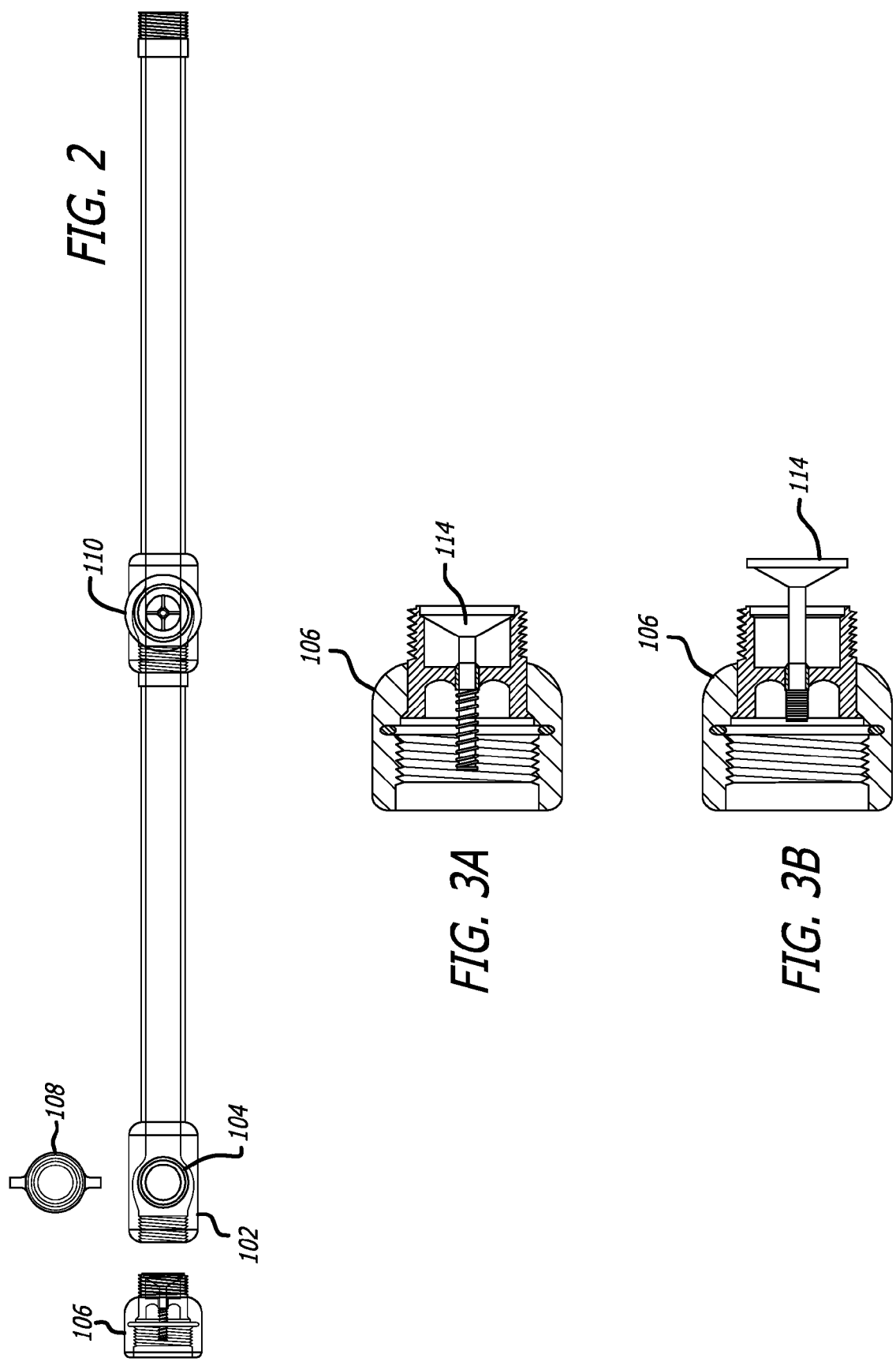

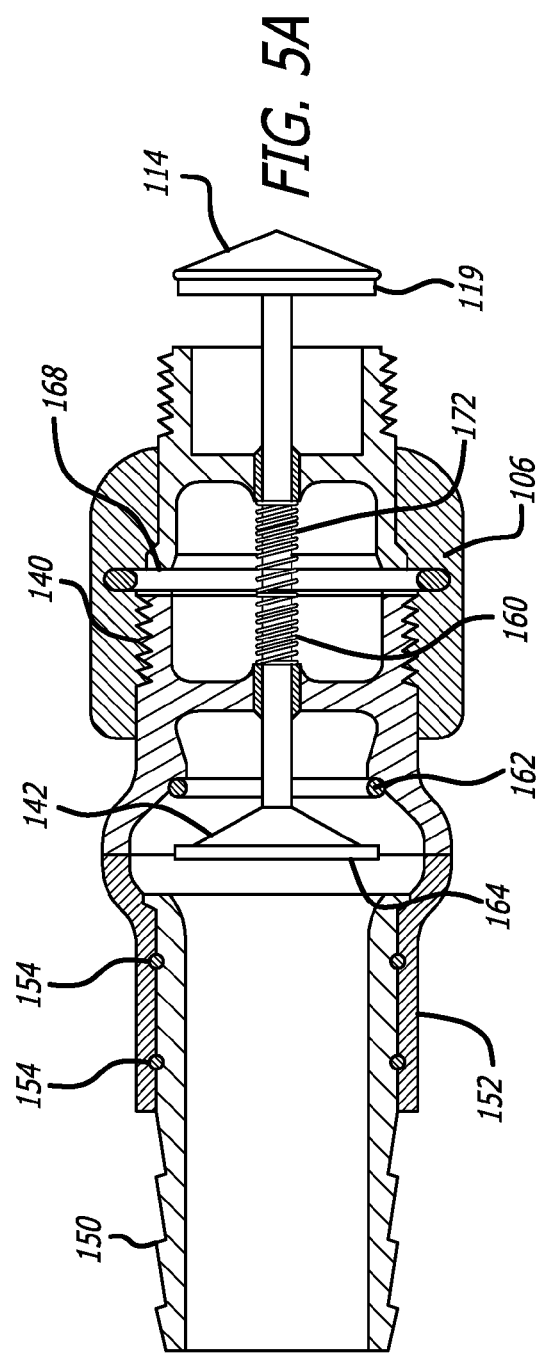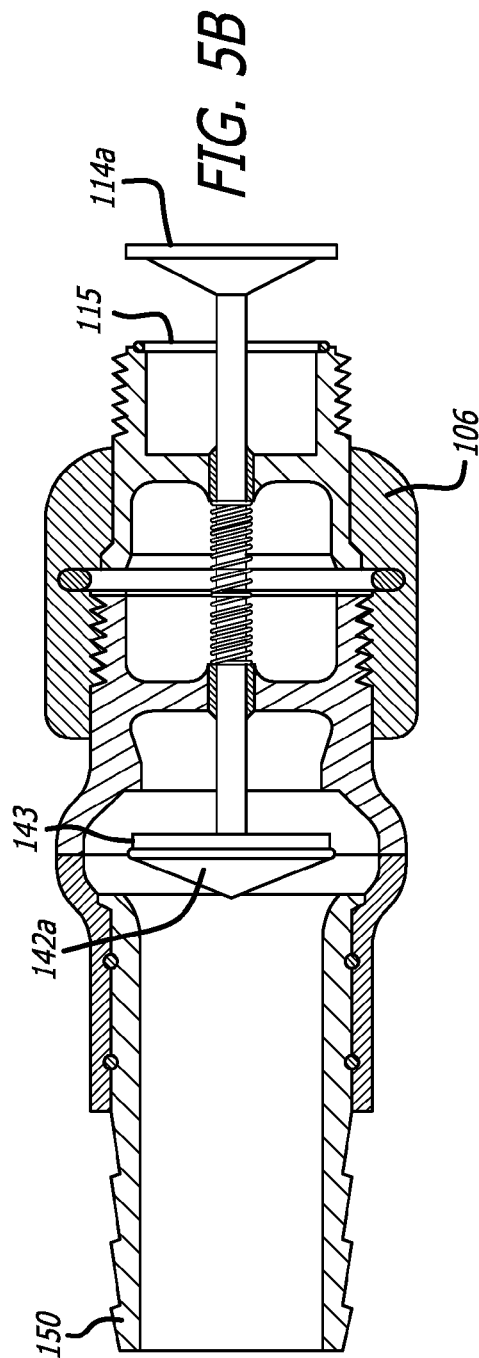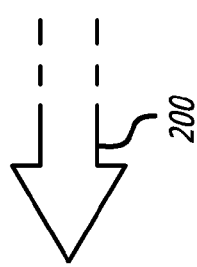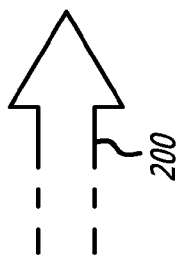

AIRCRAFT GALLEY WATER DISTRIBUTION MANIFOLD

CROSS-REFERENCES TO RELATED APPLICATIONS

This application is a continuation based on U.S. Ser. No. 14/044,487, filed on Oct. 2, 2013, which claims priority from U.S. Provisional Application No. 61/709,834, filed Oct. 4, 2012, the contents of which are incorporated herein by reference in their entirety herein.

BACKGROUND

On commercial aircraft with in-flight catering services, it is common for one or more of the galleys installed on the aircraft to be "wet," i.e. to have a water supply (potable water), water drainage (waste water), and on occasion water used in a waste disposal unit (foul water—post use). The potable water is supplied under pressure to the galley, while gravity, which can be assisted by a vacuum, is used in water drainage and waste disposal. The potable water is used for drinking water, beverage making and cooking (e.g., steam ovens, rice boilers, etc.), and therefore has to meet safety criteria that make it fit for human consumption. That is, potable water must meet certain minimum health and safety standards, and then it is generally filtered to improve taste, smell and to remove bacteria in accordance with airline policy. The aircraft galley plumbing system encompasses all aspects of water usage on a galley, its associated hardware, components and galley equipment which either consume or facilitate water handling.

All galley plumbing systems must pass design and regulatory requirements specified by the aircraft manufacturers and must undergo testing to ensure that the potable, waste and foul water systems are fully functional and remain separated to ensuring no cross contamination. Also, when the aircraft shuts down on completion of a flight, or for longer periods of storage or maintenance, all of the plumbing systems must be capable of draining completely within a specified time. Any residual water that could potentially become contaminated must be purged from the aircraft galley plumbing system. Therefore, the system allows air contained within the plumbing system pipes, hoses, and components to be displaced by water during the filling cycle (with the air vented out), and air replaces the water during the drainage/purge cycle (air vented in) allowing rapid water displacement.

At the resumption of service, the potable water supply circuit must be capable of being filled automatically without manual assistance, and all sections that may potentially trap air must be capable of self-venting. An important consideration to this goal is that the pressure varies depending on the aircraft and design.

From a safety standpoint, the plumbing system must also prevent hot water backflow to the faucets from the galley inserts (GAINs). Moreover, hydraulic pressure reduction is desirable to improve flow and increase water consumption capacity.

SUMMARY OF THE INVENTION

The present invention is an aircraft galley plumbing system that provides distribution for the aircraft potable water within a reduced "wet" galley envelope. A modular tubular manifold is disclosed with secondary connectors that distribute potable water supplied from the water filter/manifold block to the water consuming GAINs and galley water faucet.

Other features and advantages of the present invention will become more apparent from the following detailed description of the preferred embodiments in conjunction with the accompanying drawings, which illustrate, by way of example, the operation of the invention.

BRIEF DESCRIPTION OF THE DRAWINGS

FIG. 2 is an enlarged top view of a portion of the water distribution manifold;

FIG. 3a is a cross section of the quick disconnect in the closed configuration;

FIG. 3b is a cross section of the quick disconnect in the open configuration;

FIG. 5a is a cross section of the quick disconnect and flexi hose connector coupling with the flow exiting the quick disconnect to the left; and FIG. 5b is a cross section of the quick disconnect and flexi hose connector coupling with the flow exiting the quick disconnect to the right.

DETAILED DESCRIPTION OF THE PREFERRED EMBODIMENTS

Figure 1:
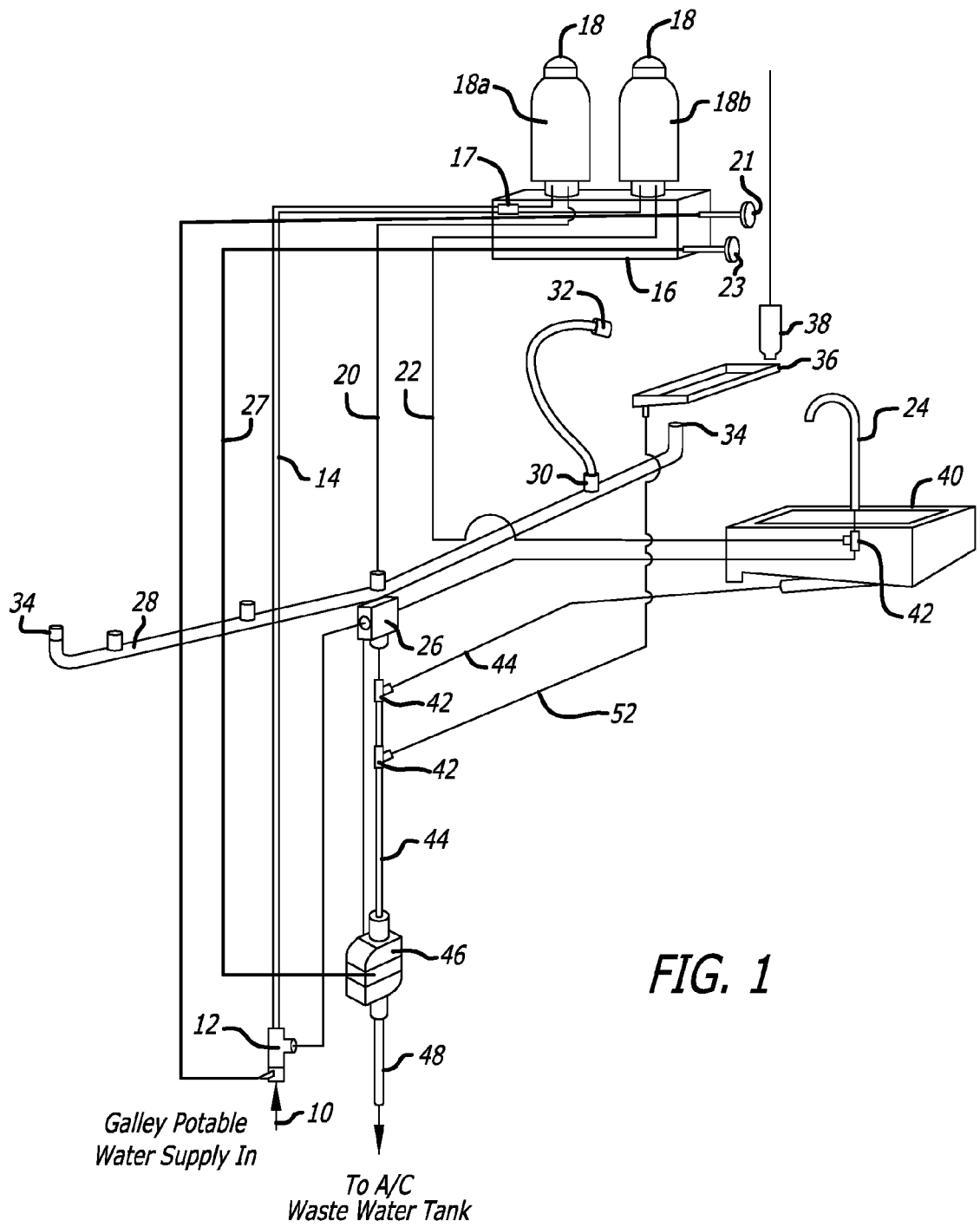
FIG. 1 is a schematic diagram for an aircraft plumbing system.

The plumbing system as shown in FIG. 1 illustrates a schematic diagram for a compact integrated plumbing system designed for use in a reduced foot print refrigerated/wet galley. Water is provided via a bottom fed potable water delivery system where the water supply originates from the bottom of the monument, although similar systems include water fed from above. The invention works well with either system, as well as other plumbing systems. Potable water (indicated by arrow 10) enters the plumbing system via a "T" valve 12 incorporating a remotely operated emergency supply shut off valve. The main feed 14 supplies the water distribution/filter block 16 through a two way or three way valve 17, where it is filtered using a selected filtration method such as, for example, a spin on type water purification cartridges that incorporate self-venting units 18. Preferably two or more filters 18 are used to reduce back pressure in the system and to allow airlines to select different levels of filtration, a GAINS supply line water filter 18a, and a faucet supply line water filter 18b. One line 20 connected to the filter 18a supplies the galley insert equipment (GAINS) via the GAIN water distribution manifold 28 to coffee makers, chillers, steam ovens, etc. The other line 22 from the filter 18b supplies the fresh water faucet 24. The distribution/filter block 16 includes a remote emergency potable water shut off valve 21 and a backflow prevention valve manual override 23 controlled by a cable 27.

The second branch of the Tee valve 12 supplies pressurized water to the compact pressure check valve 26 at a pre-defined pressure. This check valve 26 closes the valve 12, preventing drain down from the GAIN water distribution manifold 28. The distribution manifold 28 supplies potable water via quick disconnect fittings 30. The GAINS are connected to the manifold 28 by flexible hoses 32. The manifold 28 also preferably incorporates self-venting devices 34 to aid the (potable water) filling process, as does the faucet 24. Water from the faucet 24, from GAIN drip trays 36 via condensate drainage catch pots 38, and any condensate from galley air chiller units, is disposed of via drain line 52 to waste line 44 via Tee piece 42. Drainage of waste water entering the sink is accomplished via a Tee piece 42 in the waste water drain line 44 and through a compact, backflow prevention device or air stop valve 46, which operates under a partial vacuum. A manual over ride is remotely connected to the distribution filter block 16. Both the potable drain line 52 and waste water line 44 drain down into the aircraft waste water tank via line 48.

In the foregoing plumbing system, all of the waste water drains downward to the aircraft waste water tank (not shown). Filtered water is distributed from the filter 18a to the GAINS manifold 28 and then to the GAINS via flex hose connections 32. The system is self-venting through various self-venting devices 34, the water filters 18 and faucet 24. All standing water can be quickly vented to prevent contamination of the system and comply with regulation for potable water systems.

FIG. 2 illustrates a portion of the distribution manifold 28 of FIG. 1. The manifold 28 of the present invention includes a rigid tubular section that can be mechanically linked to similar tubular sections using a threaded coupling to provide a variable sized water distribution manifold. The female end of each section may be provided with a bell chamber 102 having two or more ports 104 that can either be fitted with a manifold quick connector 106, or if not to be used, a blanking or sealing cap 108. The manifold quick connector (MQC) 106 is designed to mate with a flexible hose connector (FHC) 110, which may include a flange mating or a welded mating, or the quick connector 106 can alternatively incorporate a terminating self-venting/self-draining (SV/SD) device 112. FIGS. 3a and 3b illustrate a cross sections through the MQC 106 in the closed and open configurations, respectively. When there is no coupling with the MQC 106, the poppet 114 bears against the opening of the MQC 106, preventing flow through the device. However, when the MQC 106 is connected to a fitting, the poppet 114 is extended as shown in FIG. 3b, allowing flow to pass around the poppet and through the fitting. In this way, an automatic flow control device is formed based on the presence of the MQC 106.

Figure 4:
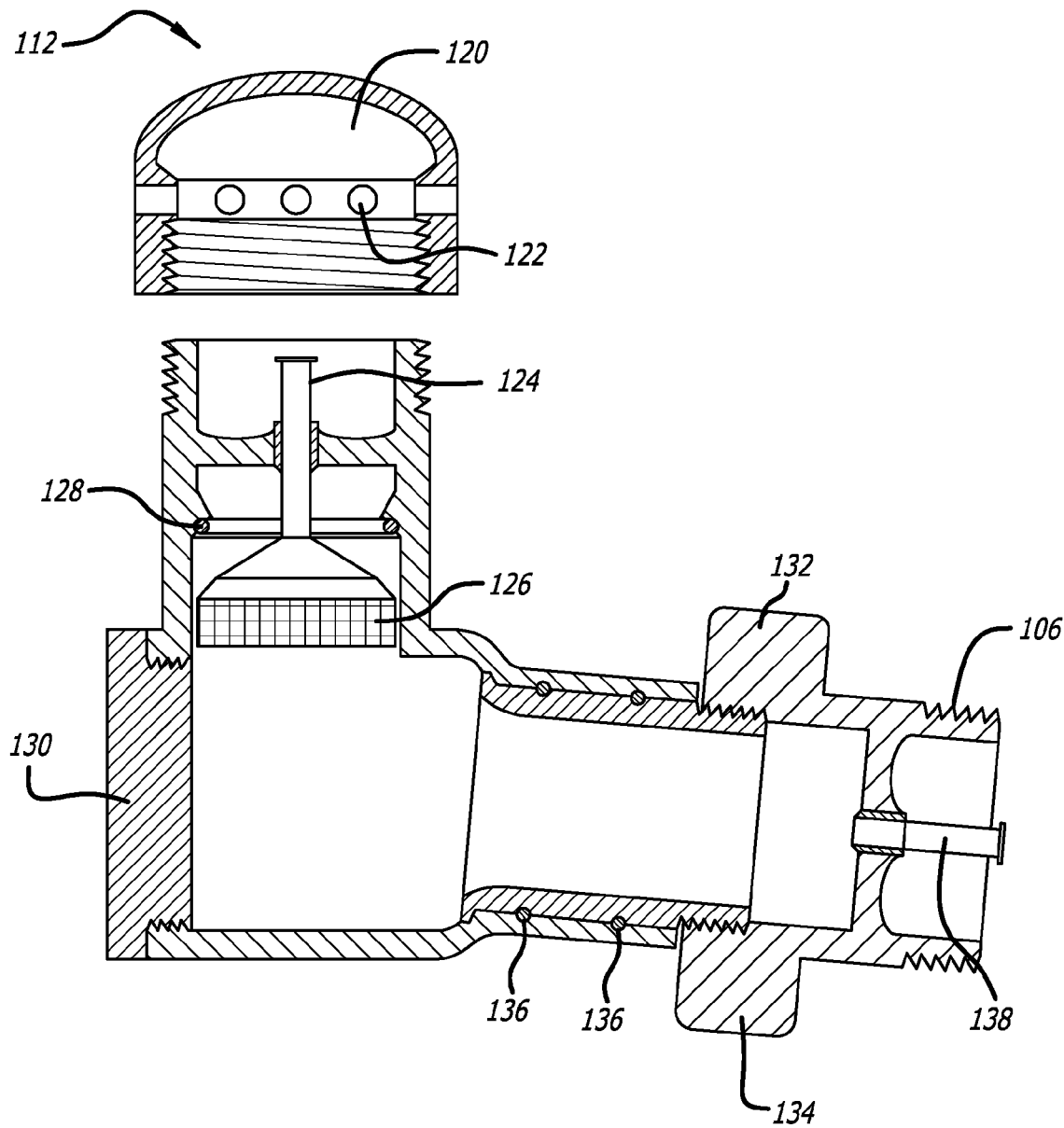
FIG. 4 is a cross section of the self-venting, self-draining manifold and quick disconnect.

The SV/SD manifold 112 shown in FIG. 4 includes an air vent cap 120, air vent holes 122, venting poppet 124 with poppet float 126, an O-ring seal 128, and a service cap 130. The manifold also includes a rotating ferrule 132 that mates with a MQC 106, where the angled ferrule 132 may be alternatively replaced with a straight ferrule. The rotating ferrule 132 allows the SV/SD manifold 112 to be attached to or removed from a MQC 106 without the need to dismantle the complete system. To aid in the connection and disconnection, the MQC 106 may be equipped with thumb grips 134 that make gripping and rotating easier. Water is prevented from leaking from the device by twin O rings 136. To open the self-sealing poppet 114 of the MQC 106, a fixed pin 138 is provided. To aid manufacturing assembly, the floating section is formed in two halves, and accessed through the service cap 132.

On filling the aircraft galley plumbing system with potable water, air has to be expelled to prevent airlocks and ensure consistent water flow. To achieve this, the venting poppet 124 is free to move and/or held against its sealing O-ring 128. Water entering the galley plumbing system displaces the air that escapes past the poppet head while it is un-seated from the O-ring 128. Once the potable water reaches the device 112, the water back pressure closes the poppet 124 via the poppet float 126, which is made of a suitable buoyant material such as cork or air float. At the end of a flight, the water pressure in the galley plumbing system falls when the aircraft water supply is turned off, opening the poppet 124 and leading to rapid drain down of the system. To ensure no water remains trapped, the SV/SD manifold 112 is fitted with an air cap 120 to allow air to enter the plumbing system while excluding potential contamination.

In the operation of the manifold quick connector 106 and flexi hose connector 110, shown in FIGS. 5a and 5b, the primary connection of both fittings is made using a screw thread 140. Both the connectors 106, 110 are designed to be self-sealing to prevent excessive water loss following the removal of a flexi hose 32, with the poppet valves having an interdependent opening/closure feature that operates automatically during connection or disconnection. The connector poppets 142 are designed to reduce flow restriction and are therefore shaped to favor the primary water flow direction, i.e. flow from the hose 32 to the manifold 106 or from the manifold 106 to the hose 32 as the case may be.

There are two variations of the MQC 106 coupled to a FHC 110 of FIG. 5a,b. In both cases, the poppet valves are open, and the poppet valves are designed to act on each other when the connectors 106, 110 are screwed together to allow water to flow through the assembly. In the first case, of the FHC 110 includes the ferrule 150 for crimping to the flexi hose 32. The ferrule 150 can be rotated to allow connection to the MQC 106, and the ferrule 150 is sealed to the flexi hose 32 connector body 152 by two "O" ring seals 154. The poppet 142 is normally closed by the spring 160, sealing against the "O" ring seal 162 such that water restriction is reduced through the bell chamber 164 into which the poppet opens. A threaded connection 140 joins the FHC 110 and the MQC 106, including a primary sealing washer 168 that provides the main waterproof joint between the connectors. The self-closing poppet 114 of the MQC 106 opens into a manifold bell chamber and is controlled by the spring 172 to bias the poppet 114 closed. A manifold coupling seal 119 is disposed on the poppet 114 to prevent leakage between the coupling body 106. As shown in FIG. 5b, the shape or the direction of the poppets 142a, 114a may change depending upon the primary direction of the water flow, as indicated by arrows 200, with the poppet 142a carrying the seal 143 on its forward or rear face while the MQC poppet 114a seals against an "O" ring 115. Apart from improving the water flow and reducing restriction, the seals 115, 143 of both couplings are located in such a way as to reduce flow erosion to their exposed surface by placing them out of direct contact with the water flow. In order to rationalize part count, the shaft lengths and heads of the poppets are interchangeable.

The present invention provides an expandable modular water distribution manifold system that dramatically reduces part count and complexity while increasing flexibility. The rigid, non metallic manifold pipe work and non metallic connectors are well suited for aircraft galleys as they reduce weight. Further, the self-sealing manifold and mutually actuating poppet valves eliminate leakage while promoting drainage of the system. In particular, the directionally optimized poppet head facilitate water flow in the primary water flow direction. Water pressure is reduced through the use of bell chambers in the connections, and ease of connection is enhanced by the use of flexi hoses that can be removed, attached, repositioned etc. without disturbing the manifold. Moreover, separate rigid manifold sections can be joined by flexible hoses if required. Adaptability is increased by the use of two flexi hose connection points that are available at each manifold joint location. Also, self venting and self draining devices can be attached to the modular manifold end points.

The plumbing system of the present invention can accommodate differing GAIN supply requirements and use a common system regardless of the size of galley. The self sealing manifold valves and flexi hoses allow GAINS to be removed without depressurizing the system, and unused connections can be sealed with a simple sealing cap. The size of the system can be varied by adding/removing sections, and water consuming GAINS can be added or removed with no major modifications to the system. The self venting/draining device(s) incorporated into the system allow automatic filling and drain down of the integrated compact galley plumbing system. The system can accommodate connectors that are either serviceable (bolted flange) or sealed (welded). The invention is suited for all types of narrow or wide bodied commercial aircraft monuments both for new and existing airplane types or variants.

The present invention has been described in a general manner, but the foregoing description and included drawings are not intended to be limiting in any manner. One of ordinary skill in the art would envision many modifications and substitutions to the embodiments described herein, and the invention is intended to incorporate all such modifications and substitutions. Therefore, the scope of the invention is properly evaluated by the words of the claims appended hereto, and not strictly to any described embodiment or embodiment depicted in the drawings.

I claim:

1. A modular potable water distribution manifold for an aircraft water supply and drainage system, comprising:
   a tubular member;
   a first manifold quick connector adapted to mate with a flexible hose connector and having a first flow control poppet;
   a second manifold quick connector having a second flow control poppet, the second manifold quick connector adapted to mate with a terminating self-venting/self-draining device, the self-venting/self-draining device including an air vent cap, air vent holes, and a service cap; and
   a rotating ferrule that mates the second manifold quick connector with the self-venting/self-draining device;
   wherein the first and second manifold quick connector flow control poppets favor the primary water flow direction; and
   wherein the presence of said first and second manifold quick connectors in the manifold positions first and second the flow control poppets to allow flow to pass through the first and second manifold quick connectors.

2. The modular potable water distribution manifold of claim 1, wherein an end of the tubular member includes a bell chamber.

3. The modular potable water distribution manifold of claim 1, wherein when the first or second manifold quick connector is connected to a fitting, said first or second manifold quick connector including said first or second poppet that extends to allow water to pass through the fitting.

4. The modular potable water distribution manifold of claim 1, wherein a venting poppet freely moves away from an O-ring, and wherein when water enters the water distribution manifold, air escapes past the venting poppet while it is un-seated from the O-ring.

* * * * *